Figure 1:
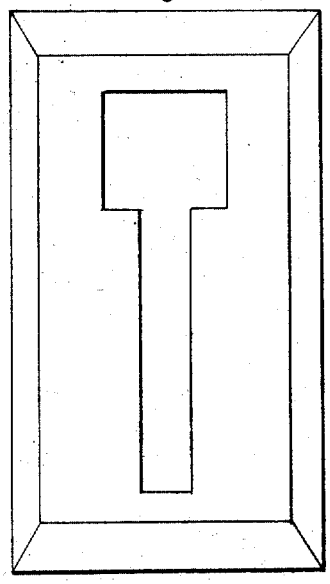
Figure 1:
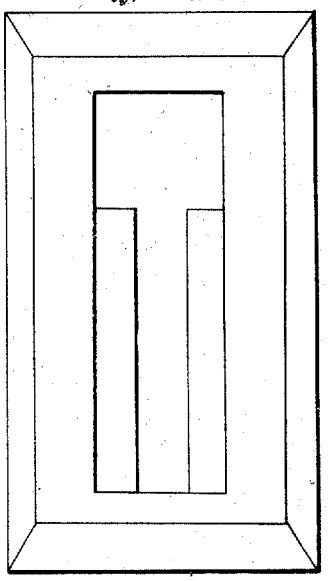
Figure 2:
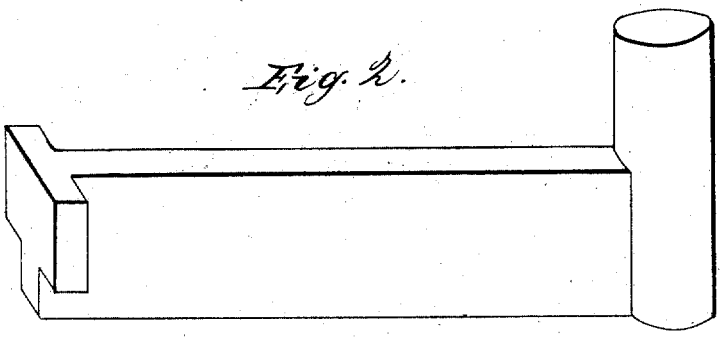

7354X

J. Richman,

Bedstead Fastening,

Patented Dec. 28, 1832.

Back View of No. 1.

N. PETERS, PHOTO-LITHOGRAPHER, WASHINGTON, D. C.

7354X Dec 28 1832 Ar 12 [illegible]

John Richman, of Lancaster, State of Ohio

Letters Patent.

The schedule referred to in these Letters Patent and making part of the same containing a description in the words of the said John Richman himself of his improvement in Bedstead fastenings.

To all persons to whom these presents shall come, John Richman of Lancaster, Fairfield County State of Ohio sends greeting — Be it known that I the said John Richman, have invented, constructed, made & applied to use a new & useful improvement not used or known before in the making & putting together & taking apart of bedsteads, called "a self fastening machine"

This improvement in putting bedsteads together and taking them apart consists of the following explanation of the drawing herewith attached & made a part of this description.

No 1 is a dovetail which is let in the post. No 2 is let in the rail, fastened by a pin leaving three quarters of an inch project, on which enters in No 1's sliding dovetail which makes the self fastening machine, it has a net bottom laced In testimony that the above is a true specification of my said improvement as above described I have hereunto set my hand this 26th day of April in the year of our Lord 1832, Witnesses
Saml. R. Dritan
D. D. Richman John Richman 252 [illegible]

Exd
Chf W.